(12) United States Patent
Choi et al.

(10) Patent No.: US 7,978,398 B2
(45) Date of Patent: Jul. 12, 2011

(54) SHELL-TYPE ELECTROPHORETIC PARTICLE, DISPLAY DEVICE INCLUDING THE PARTICLE, AND METHOD THEREOF

(75) Inventors: Jae-young Choi, Yongin-si (KR); Jai-yong Han, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/958,494

(22) Filed: Dec. 18, 2007

(65) Prior Publication Data
US 2009/0027761 A1 Jan. 29, 2009

(30) Foreign Application Priority Data
Jul. 25, 2007 (KR) .......... 10-2007-0074650

(51) Int. Cl.
*G02B 26/00* (2006.01)
(52) U.S. Cl. ............ 359/296; 359/290
(58) Field of Classification Search .......... 359/295–298, 359/290; 430/31–32, 34, 37; 345/107
See application file for complete search history.

(56) References Cited

U.S. PATENT DOCUMENTS

| | | | |
|---|---|---|---|
| 7,576,903 B2 * | 8/2009 | Yamamoto et al. | 359/296 |
| 2002/0131151 A1 * | 9/2002 | Engler et al. | 359/296 |
| 2004/0135762 A1 * | 7/2004 | Noolandi et al. | 345/107 |
| 2004/0257330 A1 * | 12/2004 | Minami | 345/107 |
| 2005/0007649 A1 * | 1/2005 | Kawai et al. | 359/296 |
| 2006/0105170 A1 * | 5/2006 | Dobson et al. | 428/403 |
| 2006/0221431 A1 * | 10/2006 | Chopra et al. | 359/296 |
| 2006/0275375 A1 * | 12/2006 | Donath et al. | 424/489 |
| 2007/0115533 A1 * | 5/2007 | Kanbe | 359/296 |
| 2008/0055234 A1 * | 3/2008 | Chopra et al. | 345/107 |
| 2008/0100907 A1 * | 5/2008 | Lipovetskaya et al. | 359/296 |

* cited by examiner

*Primary Examiner* — Ricky L Mack
*Assistant Examiner* — Mahidere S Sahle
(74) *Attorney, Agent, or Firm* — Cantor Colburn LLP

(57) ABSTRACT

An electrophoretic particle includes ionic liquid stored in a spherical polymer shell and a charged layer formed on an inner surface of the shell, and a display device includes the electrophoretic particle. The shell is not charged, and the charged layer in the shell is charged. Therefore, particles having different polarities from each other do not stick to each other. Since the electrophoretic particles are dispersed in air, a high response speed can be achieved, a large amount of charges can be formed by the ionic liquid and the charged layer contacting the ionic liquid, and thus, the particles can move with a low driving voltage.

10 Claims, 7 Drawing Sheets

PRESENT INVENTION

SHELL-TYPE ELECTROPHORETIC PARTICLE, DISPLAY DEVICE INCLUDING THE PARTICLE, AND METHOD THEREOF

This application claims priority to Korean Patent Application No. 10-2007-0074650, filed on Jul. 25, 2007, and all the benefits accruing therefrom under 35 U.S.C. §119, the contents of which in its entirety are herein incorporated by reference.

BACKGROUND OF THE INVENTION

1. Field of the Invention

The present invention relates to an electrophoretic particle, a display device including the particle, and a method thereof. More particularly, the present invention relates to an electrophoretic particle having a structure that increases a response speed and efficiently prevents agglomerating with other particles, a display device using the particle, and a method thereof.

2. Description of the Related Art

One type of display employs capsules that store charged solid particles and a solution in which the solid particles are dispersed. The solid particles disposed between two electrodes forming an electric field are moved by the electric field formed by the two electrodes, and thus they are referred to as electrophoretic type particles. Such a display, hereinafter referred to as a "first type of display", is suggested by E-INK Corp.

Another type of display employs a structure in which the solid particles are dispersed in unit cells defined by ribs disposed between two substrates. Since air exists in the unit cells, the solid particles are dispersed in air. The solid particles in the unit cells are not charged in a normal status. When an electric field is generated in response to voltages applied between electrodes formed on both substrates, surface charges are generated on the surfaces of the solid particles that exist in the electric field area. Such a display, hereinafter referred to as a "second type of display", is suggested by Bridge Stone Corp.

The first and second types of displays are reflective displays. According to the first type of display, the response speed is about 30 to 200 ms, which is slow, and the moving speed of the solid particles becomes slower when an operating temperature is lowered because of the flow resistance of the liquid when the solid particles move in the liquid and a viscosity of the liquid that increases when the temperature decreases.

On the other hand, in the second type of display, since the solid particles move in air, the response speed is faster than in the first type of display, that is, 0.2 ms or faster. However, since there are not many charges on the surfaces of the solid particles that are dispersed in air, a high voltage of about 70V is required to move the solid particles. In particular, since the positive solid particles and the negative solid particles in air are mixed in each of the unit cells, the positive solid particles and the negative solid particles can stick to each other. Sticking occurs more in the second type of display than in the first type of display because an air shock-absorbing function for preventing sticking between the solid particles of opposite polarities is weaker than that of liquid.

BRIEF SUMMARY OF THE INVENTION

The present invention provides a shell-type electrophoretic particle having a structure that increases a response speed and prevents particle agglomerating, a display device using the shell-type electrophoretic particle, and a method thereof.

According to exemplary embodiments of the present invention, a shell-type electrophoretic particle includes a shell having an inner cavity, a charged layer formed inside the shell and having an electric polarity, and an ionic liquid stored in the cavity of the shell.

According to other exemplary embodiments of the present invention, a display device includes a first substrate and a second substrate facing each other, an electrode structure, a plurality of pixel regions between the first substrate and the second substrate, and a particle disposed in the pixel region, the particle including a shell having a cavity storing an ionic liquid and a charged layer.

At least one of the shell, the charged layer, and the ionic liquid may include a color material. The color material may include at least one of a dye, a pigment, and a fluorescent material.

The shell may be formed of a polymer. The charged layer may be formed of a material including at least one of a solid particle, a metal ion, an organic ion, and a polyelectrolyte.

A rib spatially defining the pixel regions may be disposed between the substrates of the display device.

According to still other exemplary embodiments of the present invention, a method of improving a display device having electrophoretic particles disposed between opposing electrodes including removing agglomeration between the electrophoretic particles by forming each electrophoretic particle with an outer shell, a charged layer formed inside of the outer shell, and ionic liquid formed within the charged layer, and increasing a response speed by disposing the electrophoretic particles between the opposing electrodes within a medium of air.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
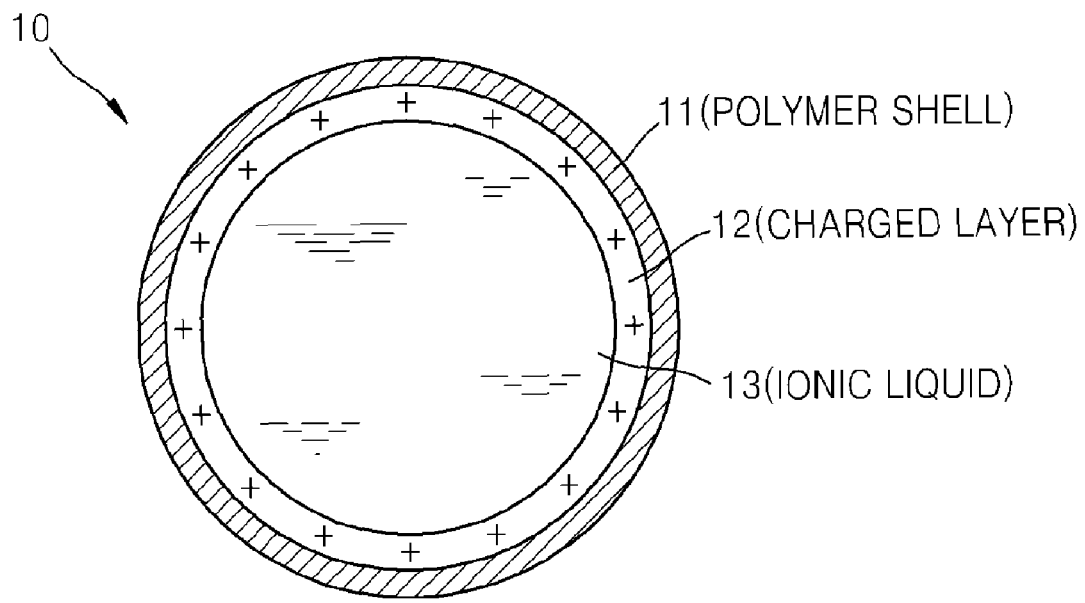
FIG. 1 is a schematic cross-sectional view of an exemplary electrophoretic particle according to an exemplary embodiment of the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section, perspective, and diagrammatic illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Photoluminescence ("PL") particles and a display device using the PL particles according to exemplary embodiments of the present invention will be described with reference to the accompanying drawings.

FIG. 1 is a cross-sectional view of an exemplary electrophoretic particle 10, also known as a PL particle, according to an exemplary embodiment of the present invention.

The electrophoretic particle 10 has a structure in which a charged layer 12 is formed on an inner side of a spherical polymer shell 11 and ionic liquid 13 is filled in a cavity inside the charged layer 12. The polymer shell 11 may be at least substantially spherical.

The spherical polymer shell 11 stores the ionic liquid 13, and the ionic liquid 13 may include a color material, that is, a PL material. The color material may be a dye or a pigment. The charged layer 12 formed in the spherical polymer shell 11 is a layer in which positive (+) charges or negative (−) charges are formed, and may be formed of a material including at least one of a solid particle, a metal particle, an organic ion, and a polyelectrolyte. The charged layer 12 also may include the PL material, as may the spherical polymer shell 11. The charged layer 12 may separate the ionic liquid 13 from the polymer shell 11. The PL material may be a dye, a pigment, or a fluorescent material. The PL material in the ionic liquid 13 forms charges in the charged layer 12.

In an exemplary embodiment of the present invention, unlike conventional particles, the particle 10 stores the ionic liquid 13 therein and includes the charged layer 12 formed by the charges.

Each of the portions in the particle 10 according to exemplary embodiments of the present invention may be formed of the following materials. It should be understood, however, that the following materials are presented as exemplary embodiments of the present invention, and that the present invention should not be limited to the following materials.

Shell (for spherical polymer shell 11):

Polystylene, Polyethylene, Polypropylene, Polyesters, Polyacrylates, Polymethacrylates, Ethylene acrylic acid, methacrylic acid copolymer, Acrylic copolymer, Polyurethanes, Poly(lactid-co-glycolide), Poly(lactic acid), poly(caprolactone), Poly(glycolic-acid), Poly(anhydrides), Poly(orthoesters), Poly(hydroxybutyric acid), Poly(alkylcyanoacrylate), Poly(lactides), Poly(glycolides), Poly(lactic acid-co-glycolic acid), Polycarbonates, Poly(p-dioxanone), Poly(alkyelne oxalate)

Charged layer (for charged layer 12):

The following materials can be used to form the charged layer, however, the present invention is not limited thereto.

Negative charges:

sulfate, carboxylic, phosphoric, phosphonic acid or polymer including ammonium or alkali metal salt of the phosphonic acid, or condensated or polymerized silicic acid (oligomeric silicic acid, polysilicic acid, polyaluminumsilicate, polysilicate microgels, polyaluminumsilicate microgels)

Figure 2A:
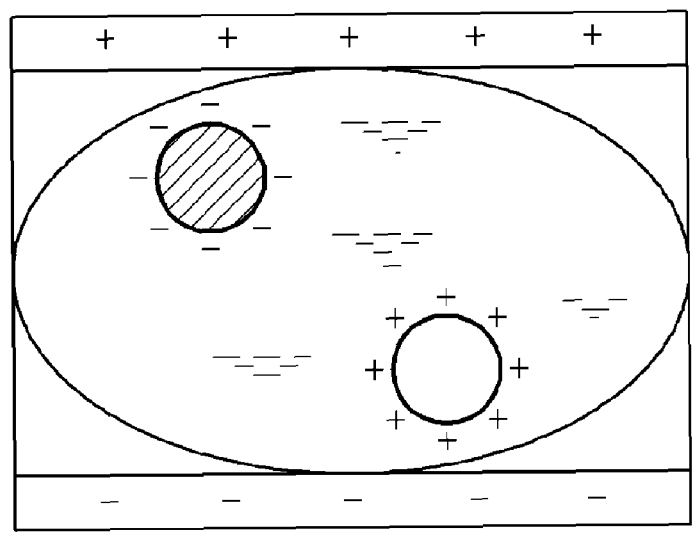
FIGS. 2A and 2B are diagrams for illustrating two conventional display devices (prior arts 1 and 2) according to the prior art.
Figure 2B:
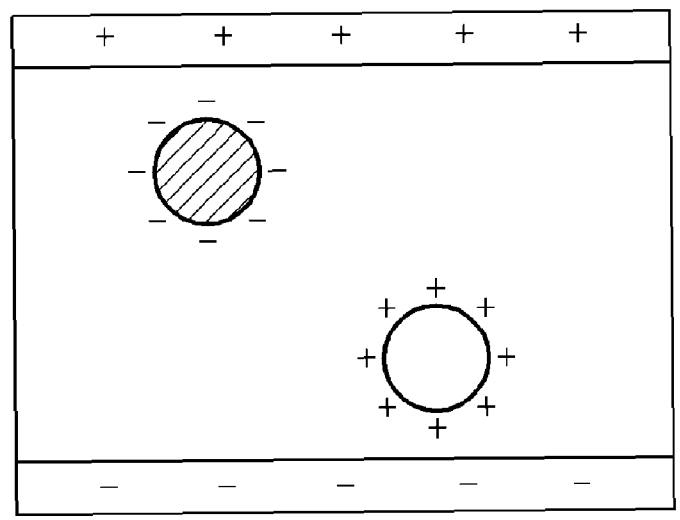
Figure 2C:
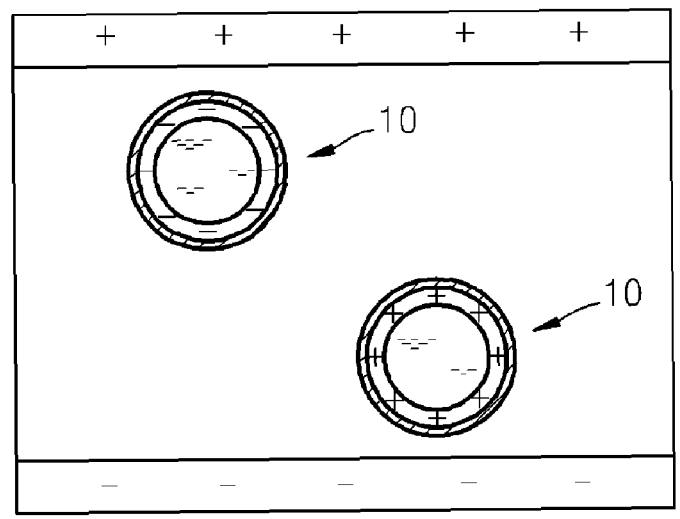
FIG. 2C is a diagram for illustrating an exemplary display device according to an exemplary embodiment of the present invention.

Positive charges:

Sulfonium, phosphonium, and polymer including primary, secondary, ternarysalt of amine (amino), and salt of quaternary ammonium Ionic liquid (for ionic liquid 13):

Water having a high dielectric constant, ionic water, and alcohol-based liquid having a low dielectric constant FIGS. 2A to 2C are diagrams illustrating a structural difference between two conventional display devices (prior art 1 and prior art 2) and an exemplary display device including the above-described particle 10 according to an exemplary embodiment of the present invention. As shown in FIGS. 2A to 2C, electrophoretic particles are placed in each display device between electrodes to which positive and negative voltages are applied.

The display device of FIG. 2A has a structure in which the charged particles are dispersed in a liquid. The display device of FIG. 2B has a structure in which the charged particles are dispersed in air. The exemplary display device according to an exemplary embodiment of the present invention as shown in FIG. 2C has a structure in which colloidal shell-type electrophoretic particles 10 having the above-described features are dispersed in air. The display device of FIG. 2C uses shell-type electrophoretic particles 10, which store the ionic liquid 13 therein and include the charged layer 12, unlike the simple particles used in the display devices of prior art 1 and prior art 2. As described above, in the display device of FIG. 2A, the particles move in the liquid, and thus, the response speed is low. In addition, when an operating temperature is lowered, a viscosity of the liquid increases and the movement of the particles become slower. In addition, in the display device of FIG. 2B, since the charged particles are dispersed in air, the response speed is much faster than that of the display device of FIG. 2A. However, since the particles are dispersed in air, a high operating voltage is required to charge the simple particles sufficiently.

With respect to FIG. 2C, the particles 10 in the exemplary embodiment of the present invention are dispersed in air, and therefore the response speed is fast. In addition, the particles 10 can be moved by a low driving voltage since the ionic liquid 13 in the particles 10 and the charged layer 12 contacting the ionic liquid 13 are highly charged.

Table 1 shows a comparison between the display devices of prior art 1 and prior art 2, as respectively shown in FIGS. 2A and 2B, and an exemplary display device of the present invention, as shown in FIG. 2C.

TABLE 1

|  | Prior art 1 | Prior art 2 | Present invention |
|---|---|---|---|
| Medium | Liquid | Air | Air |
| Response speed | 30~200 ms | >0.2 ms | 0.2 ms |
| Driving voltage | 15 V | >70 V | 15 V |
| Surface charge amount | High | Low | High |
| Agglomeration | None | Exists | None |
| Operating temperature | >0° C. | Not limited | Not limited |

As shown in Table 1, the exemplary display device including the shell-type electrophoretic particles 10 according to an exemplary embodiment of the present invention has advantages over the display devices according to prior art 1 and prior art 2. For example, the exemplary display device provides a combination of fast response speed, low driving voltage, no agglomeration, and no limitations on operating temperature.

Figure 3A:
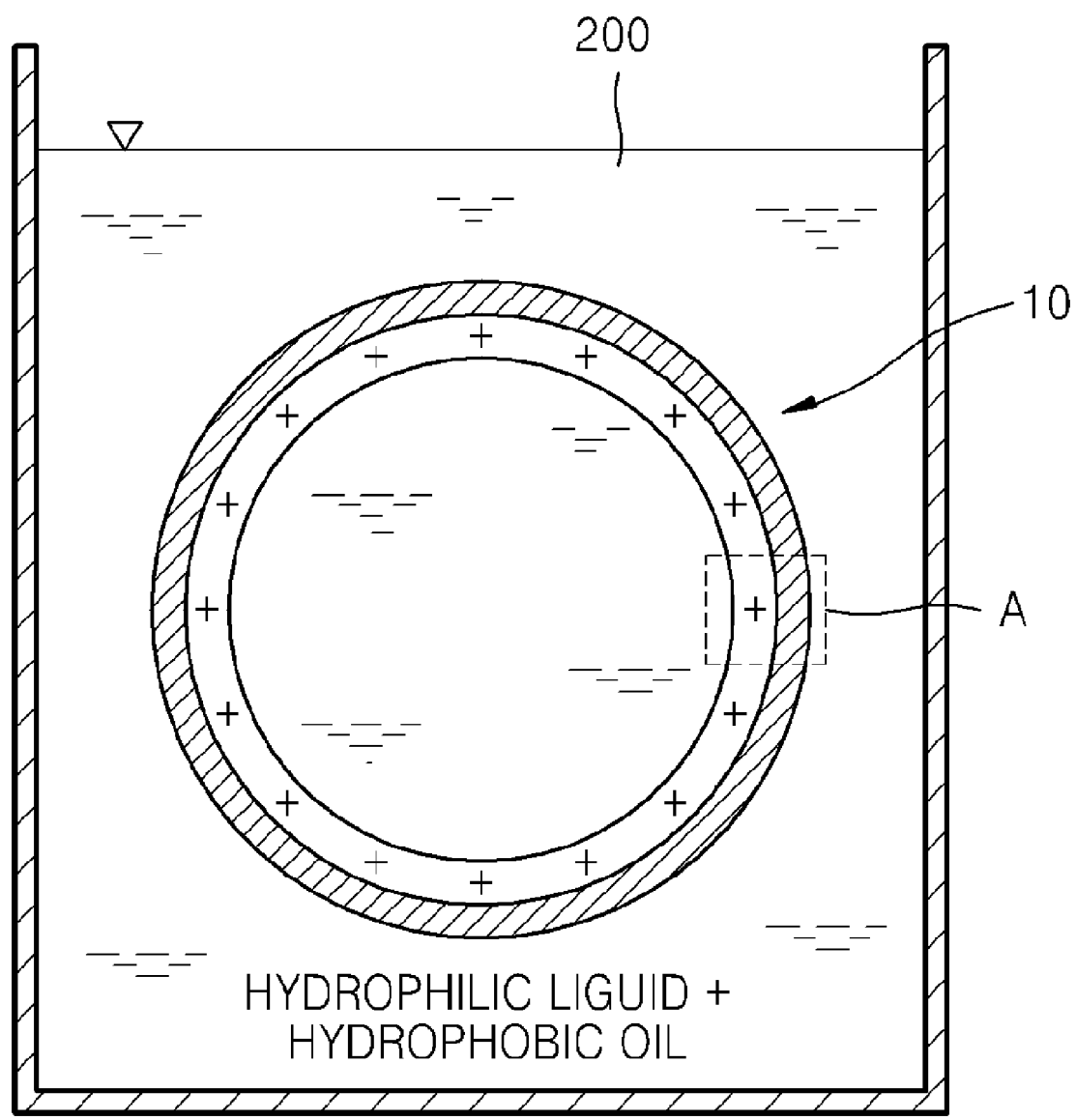
FIG. 3A is a diagram illustrating an exemplary method of compounding the exemplary electrophoretic particle according to the exemplary embodiment of the present invention.
Figure 3B:
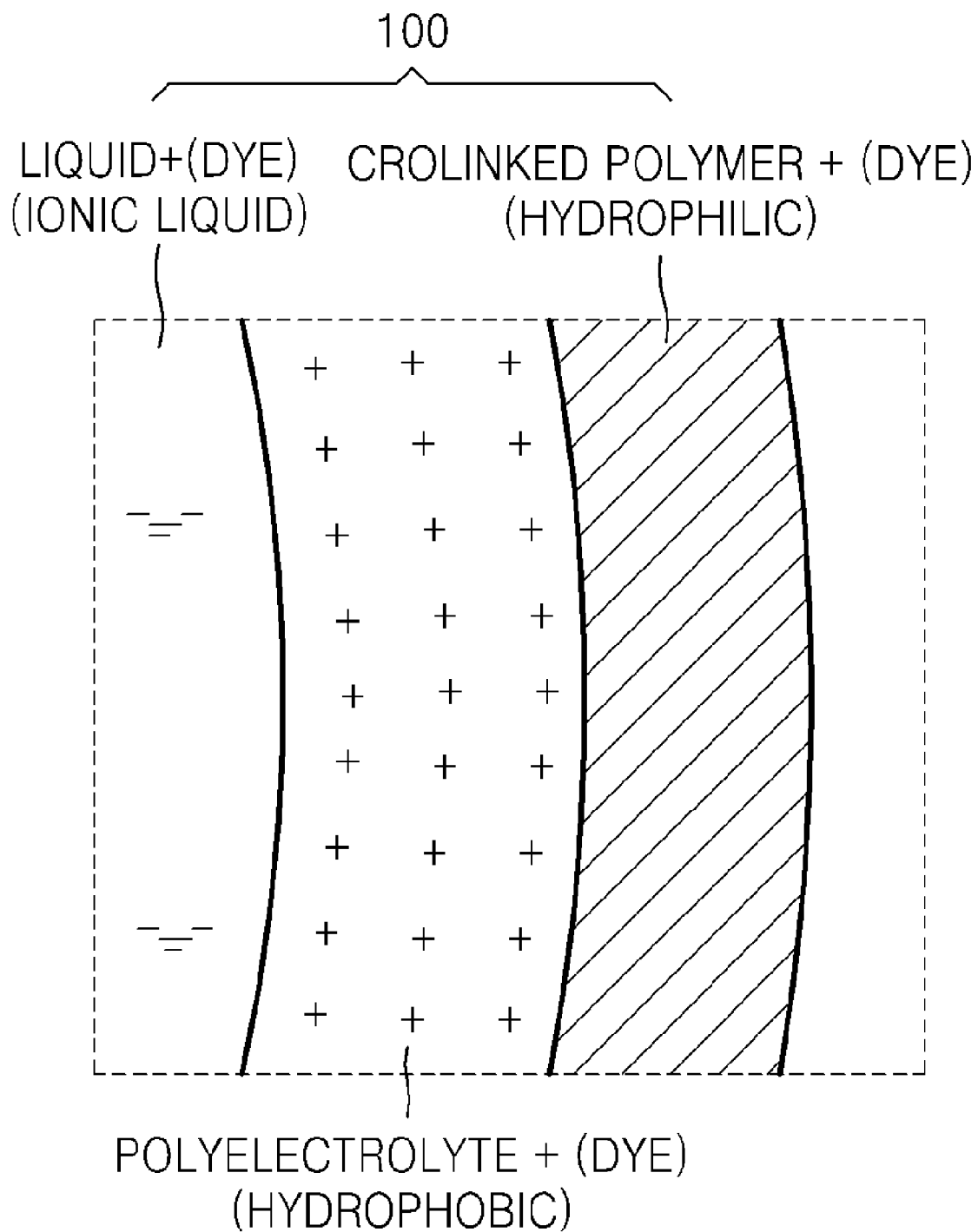
FIG. 3B is an enlarged view of portion A of FIG. 3A.

FIG. 3A is a diagram illustrating an exemplary method of compounding the exemplary shell-type electrophoretic particle according to an exemplary embodiment of the present invention, and FIG. 3B is an enlarged view of portion A of FIG. 3A. An amphiphilic polymer 100 having a hydrophilic portion and a hydrophobic portion is prepared, and the amphiphilic polymer 100 is injected into a solution 200. The solution 200 may be obtained by mixing a hydrophilic electrolyte liquid and a hydrophobic oil. Then, the solution 200 is agitated to form an emulsion, in which droplets of the electrolyte solution are dispersed in the oil. In this case, the hydrophilic portion of the amphiphilic polymer 100 may be selected so as to provide a thermosetting function or an ultraviolet ("UV") curable function to the polymer having the hydrophobic property, and then, the shell 11 storing the ionic liquid 13 may be fabricated using the curing reaction. In an alternative exemplary embodiment, the hydrophilic portion of the amphiphilic polymer 100 may be formed of a polyelectrolyte that may form charges, and in this case, the hydrophobic portion of the amphiphilic polymer 100 having the curable portion forms the shell 11 and the polyelectrolyte that can form charges forms the charged layer 12.

Figure 4:
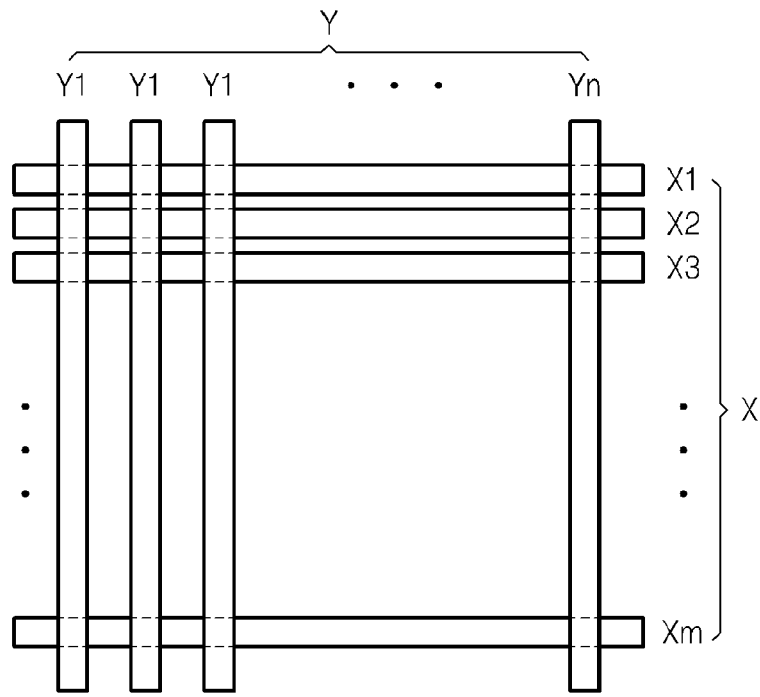
FIGS. 4 and 5 are diagrams illustrating structures of arranging exemplary electrodes for use in exemplary display devices according to exemplary embodiments of the present invention.
Figure 5:
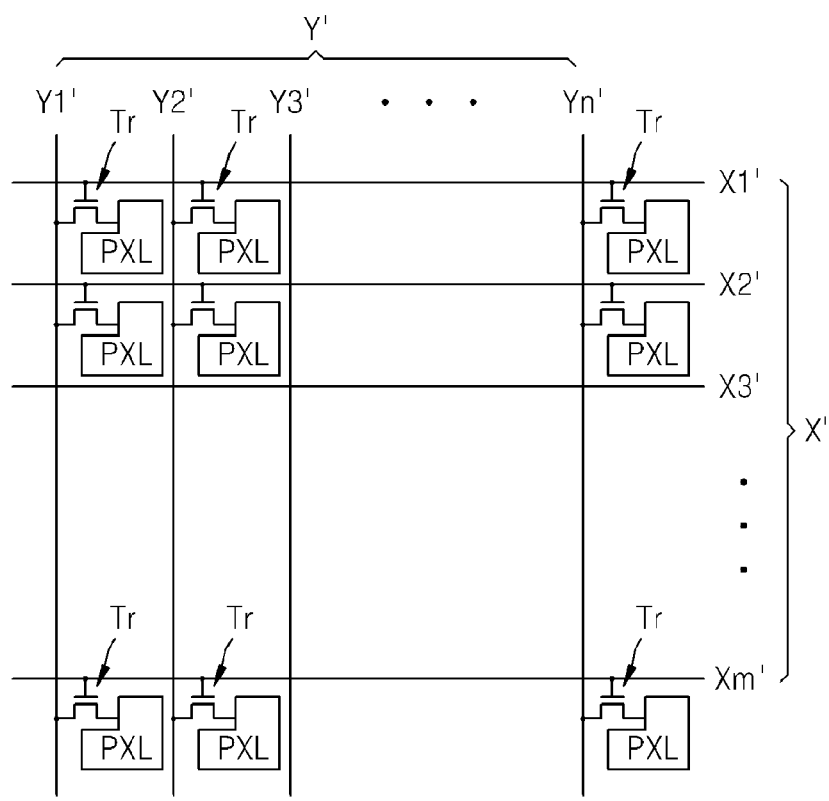

FIGS. 4 and 5 are diagrams illustrating exemplary arrangement structures of electrodes that can be used in exemplary display devices of the present invention.

FIG. 4 shows the exemplary electrode arrangement in a passive matrix type, and FIG. 5 shows the exemplary electrode arrangement in an active matrix type.

With reference to FIG. 4, in the case of the passive matrix type, the electrode arrangement includes a first electrode arrangement X having a plurality of electrodes (X1, X2, X3, ~, Xm) in a first direction and a second electrode arrangement Y having a plurality of electrodes (Y1, Y2, Y3, ~, Yn) in a section direction that crosses the first direction at a right angle. That is, the first direction may be substantially perpendicular to the second direction. In a display device having the passive matrix type arrangement, a plurality of unit pixels are provided within the display device. In an exemplary embodiment of the passive matrix type, the unit pixels may be defined at portions relative to where the first electrode arrangement X and the second electrode arrangement Y cross each other.

With reference to FIG. 5, the active matrix type includes a first electrode arrangement X', such as a plurality of gate lines, and a second electrode arrangement Y', such as a plurality of data lines. The display device having the active matrix type also includes a plurality of unit pixels. Each of the unit pixels in the active matrix type includes a transistor Tr disposed on a portion where each of the electrodes (X1', X2', X3', ~, Xm) of the first electrode arrangement X' and each of the electrodes (Y1', Y2', Y3', ~, Yn) of the second electrode arrangement Y' cross each other, and each of the unit pixels includes a pixel electrode PXL connected to the transistor Tr. A region representing colors is determined by the pixel electrode PXL connected to the transistor Tr, and a common electrode (not shown) corresponding to all of the pixel electrodes PXL is disposed on a portion facing the pixel electrodes PXL. The structure of the active matrix shown in FIG. 5 may be substantially the same as the electrode structure of general liquid crystal displays ("LCDs").

Figure 6:
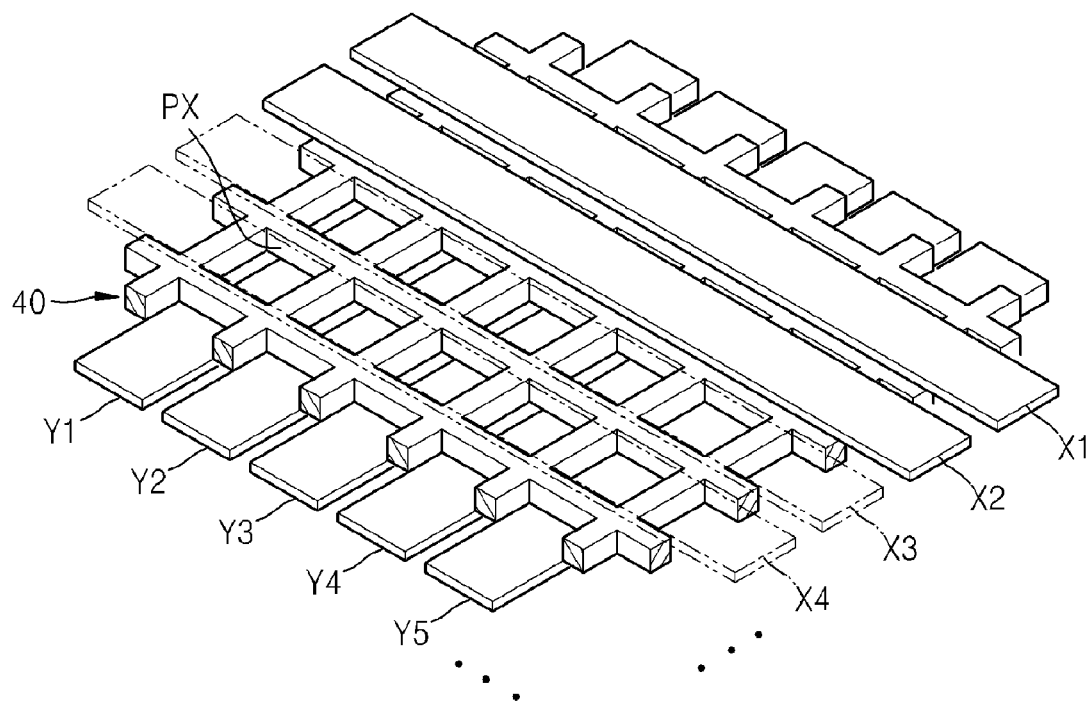
FIG. 6 is a diagram of an exemplary rib (or barrier) structure defining unit cells in a passive matrix type display device according to an exemplary embodiment of the present invention.
Figure 7:
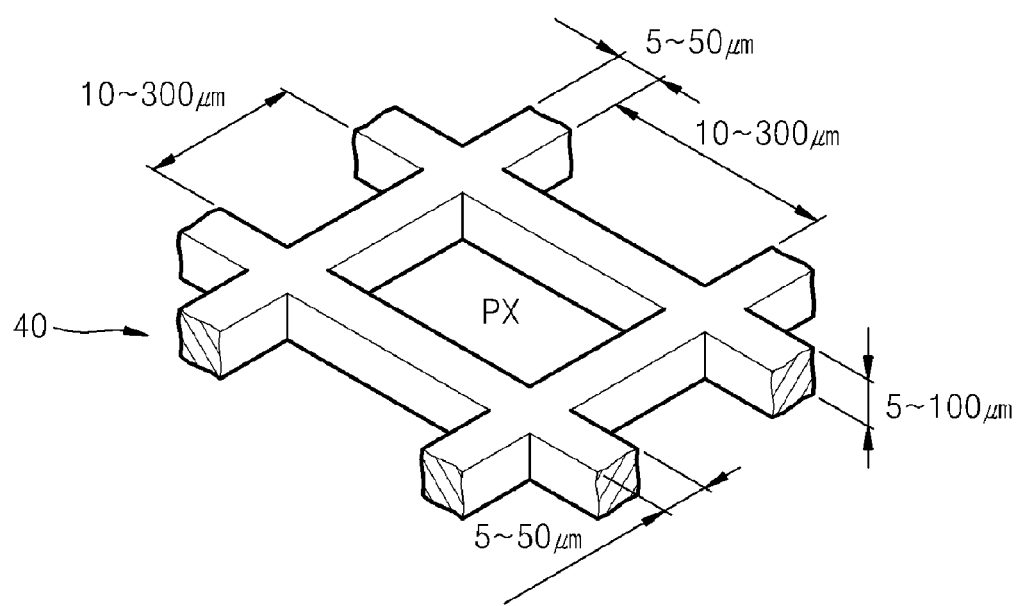
FIG. 7 is a partially enlarged view of the exemplary rib structure of FIG. 6.

FIG. 6 is a diagram showing an exemplary rib (or barrier) structure defining unit cells in an exemplary display device of the present invention, in which the exemplary display device has a passive matrix type electrode arrangement structure as shown in FIG. 4. FIG. 7 is a partially enlarged view of the exemplary rib.

As shown in FIGS. 6 and 7, the rib 40 has a grating structure defining pixel regions PX that are arranged in gratings in horizontal and transverse directions. A width and a length of each pixel region PX are each about 10 μm to about 300 μm. In addition, a width and a height of the rib 40 are respectively about 5 to about 50 μm and about 5 to about 100 μm.

The first electrode arrangement (X1, X2, X3, X4~) and the second electrode arrangement (Y1, Y2, Y3, Y4~) crossing the first electrode arrangement at the right angle are disposed on upper and lower portions of the rib 40 having the above structure, such that the first electrode arrangement may be separated from the second electrode arrangement by a distance of at least a height of the rib 40. The first and second electrode arrangements are formed on a first substrate (not shown) and a second substrate (not shown), respectively, like in general display devices.

Figure 8:
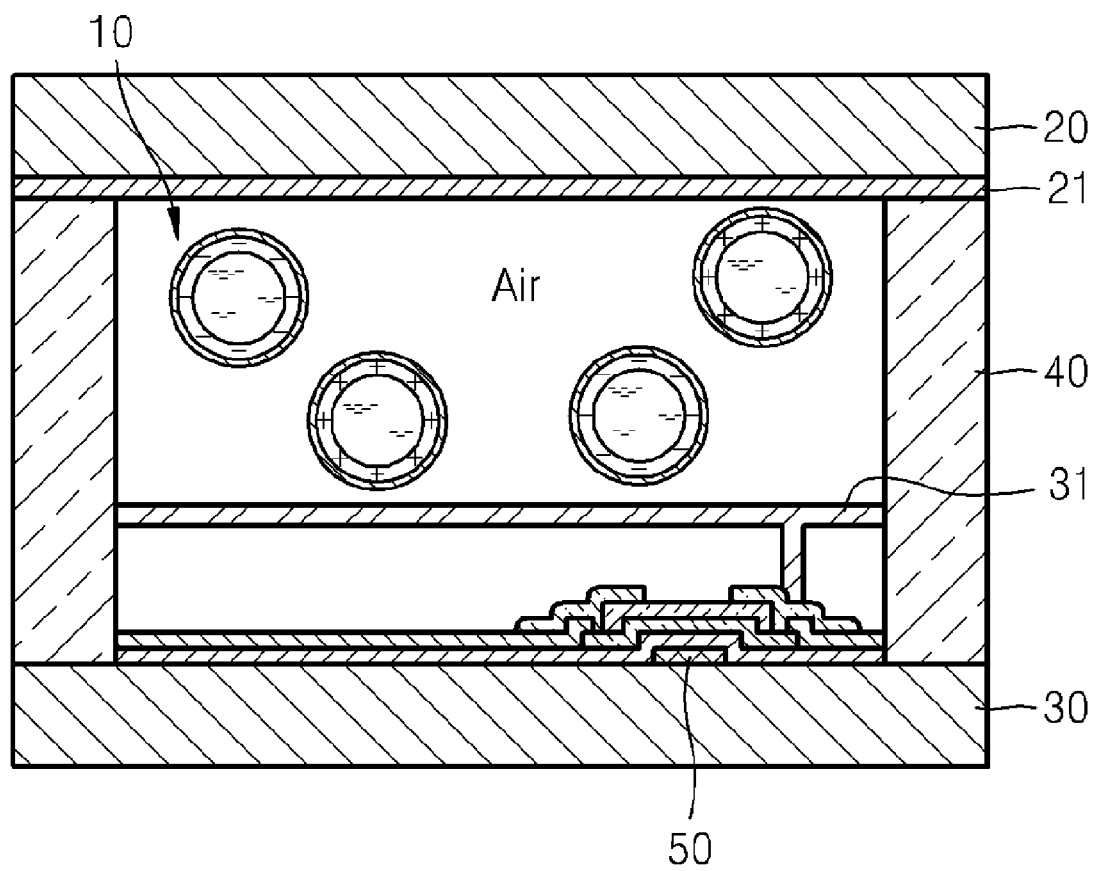
FIG. 8 is a cross-sectional view of a structure of an exemplary active matrix type display device according to an exemplary embodiment of the present invention.

FIG. 8 is a cross-sectional view of an exemplary display device having an exemplary active matrix type electrode structure according to an exemplary embodiment of the present invention.

A rib 40, defining the pixel regions, which are filled with air, is disposed between a first substrate 20 and a second substrate 30. The common electrode 21 is formed on an inner surface of the first substrate 20, and a driving transistor 50 and a pixel electrode 31 connected to the driving transistor 50 are formed on an inner surface of the second substrate 30. In the pixel region, positive electrophoretic particles 10 and negative electrophoretic particles 10 exist. The positive electrophoretic particle 10 and the negative electrophoretic particle 10 generate rays having different wavelengths from each other.

The electrophoretic particles of the present invention have advantages of both of the above-described conventional types. That is, in order to obtain a fast response speed in a reflective type display device used in a paper type display, the medium that applies the lowest resistance when the particles move is air. According to the present invention, since the electrophoretic particles move in air, the response speed can be improved. In addition, air viscosity rarely changes with the temperature, and thus, high response speed can be obtained even at low temperature. Although air is used as the medium, a charged layer is formed in a shell of the electrophoretic particle of the present invention, and thus, sticking between particles having opposite polarities can be prevented, and a high driving voltage that is required to move the solid particles in the air can be reduced.

Accordingly, the shell-type particles of the exemplary embodiments of the present invention can be used in a display device representing colors according to electrophoresis, in particular, in flexible displays, for example, paper type displays.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
   a first substrate and a second substrate facing each other;
   an electrode structure;
   a plurality of pixel regions between the first substrate and the second substrate; and
   an electrophoretic particle disposed in each pixel region and configured to move between the first substrate and the second substrate, the electrophoretic particle comprising:
   a shell having an inner cavity;
   a charged layer disposed on an entire inner wall of the shell in the inner cavity and having a single electric polarity; and
   an ionic liquid stored in the cavity of the shell,
   wherein an outer surface of the shell is not electrically charged.

2. The display device of claim 1, wherein at least one of the shell, the charged layer, and the ionic liquid includes a color material.

3. The display device of claim 2, wherein the color material includes at least one of a dye, a pigment, and a fluorescent material.

4. The display device of claim 3, wherein the shell is formed of a polymer.

5. The display device of claim 3, wherein the charged layer is formed of a material including at least one of a solid particle, a metal ion, an organic ion, and a polyelectrolyte.

6. The display device of claim 1, wherein the shell is formed of a polymer.

7. The display device of claim 1, wherein the charged layer is formed of a material including at least one of a solid particle, a metal ion, an organic ion, and a polyelectrolyte.

8. The display device of claim 1, further comprising air filling a space between the first and second substrates within each pixel region, wherein the electrophoretic particle moves through the air based on charges in the electrode structure.

9. The display device of claim 8, further comprising a plurality of electrophoretic particles formed in each pixel region, wherein agglomeration does not occur between the plurality of electrophoretic particles due to the charged layer in each of the electrophoretic particles.

10. The display device of claim 1, wherein driving voltage of the display device is about 15V and operating temperature does not substantially affect performance of the display device.

* * * * *